United States Patent
Raj et al.

(10) Patent No.: US 11,874,867 B2
(45) Date of Patent: *Jan. 16, 2024

(54) SPEECH TO TEXT (STT) AND NATURAL LANGUAGE PROCESSING (NLP) BASED VIDEO BOOKMARKING AND CLASSIFICATION SYSTEM

(71) Applicant: Bank of America Corporation, Charlotte, NC (US)

(72) Inventors: Utkarsh Raj, Charlotte, NC (US); Maharaj Mukherjee, Poughkeepsie, NY (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/894,247

(22) Filed: Aug. 24, 2022

(65) Prior Publication Data

US 2022/0405316 A1 Dec. 22, 2022

Related U.S. Application Data

(63) Continuation of application No. 17/218,427, filed on Mar. 31, 2021, now Pat. No. 11,461,379.

(51) Int. Cl.
*G06F 16/34* (2019.01)
*G10L 15/26* (2006.01)
(Continued)

(52) U.S. Cl.
CPC ............ *G06F 16/345* (2019.01); *G06F 16/75* (2019.01); *G06F 16/7834* (2019.01); *G06N 3/08* (2013.01);
(Continued)

(58) Field of Classification Search
CPC .... G06F 16/345; G06F 16/75; G06F 16/7834; G06F 16/71; G06F 16/7844; G06N 3/08;
(Continued)

(56) References Cited

U.S. PATENT DOCUMENTS 8,265,333 B2    9/2012   Lahr et al.
8,705,933 B2    4/2014   Eyer
(Continued)

OTHER PUBLICATIONS

"What is Azure Media Services Video Indexer?" Azure Media Services—Microsoft Docs https://docs.microsoft.com/en-us/azure/media-services/video-indexer/video-indexer-overview Feb. 5, 2021, pp. 1-8.
(Continued)

*Primary Examiner* — Quoc A Tran
(74) *Attorney, Agent, or Firm* — Banner & Witcoff, Ltd.

(57) ABSTRACT

Aspects of the disclosure relate to annotated video content. A computing platform may train a model using video content, which may configure the model to classify topics and identify speakers of future video content using STT and NLP. The computing platform may input new video content into the model, which may output an annotated version of the new video content. The model may be configured to generate the annotated version of the new video content by: 1) using one or more STT techniques to produce STT results, 2) classifying topics based on the STT results, 3) identifying speakers based on analysis of voice information, and 4) generating an index indicating a speaker and/or a topic corresponding to time segments. The computing platform may store the annotated version of the new video content, which may be navigable by a user using the visual index.

20 Claims, 9 Drawing Sheets

(51) Int. Cl.
| | |
|---|---|
| *G06F 16/783* | (2019.01) |
| *G06Q 10/1053* | (2023.01) |
| *G06F 16/75* | (2019.01) |
| *G06N 20/00* | (2019.01) |
| *G06N 3/08* | (2023.01) |
| *G10L 15/07* | (2013.01) |
| *H04N 21/266* | (2011.01) |
| *G06F 17/00* | (2019.01) |
| *G06F 16/71* | (2019.01) |
| *G06N 3/0464* | (2023.01) |
| *H04N 21/233* | (2011.01) |
| *G10L 17/00* | (2013.01) |
| *G06N 3/09* | (2023.01) |
| *H04N 21/2343* | (2011.01) |

(52) U.S. Cl.
CPC ......... *G06N 20/00* (2019.01); *G06Q 10/1053* (2013.01); *G10L 15/07* (2013.01); *G10L 15/26* (2013.01); *G06F 16/71* (2019.01); *G06F 16/7844* (2019.01); *G06F 17/00* (2013.01); *G06N 3/0464* (2023.01); *G06N 3/09* (2023.01); *G10L 17/00* (2013.01); *H04N 21/233* (2013.01); *H04N 21/234336* (2013.01); *H04N 21/26603* (2013.01)

(58) Field of Classification Search
CPC ........ G06N 20/00; G06N 3/0464; G06N 3/09; G06Q 10/1053; G10L 15/07; G10L 15/26; G10L 17/00; H04N 21/233; H04N 21/234336; H04N 21/26603
See application file for complete search history.

(56) References Cited

U.S. PATENT DOCUMENTS

| | | |
|---|---|---|
| 8,737,681 B2 | 5/2014 | Lahr et al. |
| 9,070,187 B2 | 6/2015 | Lahr et al. |
| 9,183,884 B2 | 11/2015 | Tapper |
| 9,236,093 B2 | 1/2016 | Tapper |
| 9,754,170 B2 | 9/2017 | Lahr et al. |
| 9,792,957 B2 | 10/2017 | Bloch et al. |
| 9,997,200 B2 | 6/2018 | Eyer |
| 10,198,638 B2 | 2/2019 | Lahr et al. |
| 10,445,588 B2 | 10/2019 | Lahr et al. |
| 10,594,981 B2 | 3/2020 | Gilley et al. |
| 10,600,448 B2 | 3/2020 | Smith |
| 10,681,424 B2 | 6/2020 | Lee et al. |
| 10,692,540 B2 | 6/2020 | Bloch et al. |
| 10,885,944 B2 | 1/2021 | Bloch et al. |
| 2003/0078766 A1 | 4/2003 | Appelt et al. |
| 2015/0139610 A1* | 5/2015 | Syed ............... G11B 27/34 386/241 |
| 2015/0382079 A1* | 12/2015 | Lister ............... G11B 27/28 725/38 |
| 2019/0317986 A1* | 10/2019 | Kobayashi ........... G06F 40/169 |
| 2020/0125600 A1* | 4/2020 | Jo ..................... G06F 16/784 |

OTHER PUBLICATIONS

Dr. David Hartzband "Natural Language Processing (NLP) and Auto-Indexing in Healthcare" RCHN Community Health Foundation https://www.rchnfoundation.org/?p=5349 website visited Mar. 30, 2021, pp. 1-6.

"Video AI technologies" Microsoft Video Indexer https://vi.microsoft.com/en-us/learn website visited Mar. 30, 2021, pp. 1-4.

Jul. 20, 2022 U.S. Notice of Allowance U.S. Appl. No. 17/218,427.

* cited by examiner

SPEECH TO TEXT (STT) AND NATURAL LANGUAGE PROCESSING (NLP) BASED VIDEO BOOKMARKING AND CLASSIFICATION SYSTEM

CROSS REFERENCE TO RELATED APPLICATIONS

This application is a continuation of and claims priority to co-pending U.S. application Ser. No. 17/218,427, filed Mar. 31, 2021, and entitled "Speech To Text (STT) And Natural Language Processing (NLP) Based Video Bookmarking And Classification System," which is incorporated herein by reference in its entirety.

BACKGROUND

Aspects of the disclosure relate to speech to text and natural language processing. In particular, one or more aspects of the disclosure relate to providing improved video streaming functionalities using speech to text and natural language processing components.

In some instances, enterprise organizations may produce video content for various purposes, which may be available to employees of the enterprise organization for future playback. In some instances, individuals may be interested in a portion of the video content, but not the full content in its entirety. In these instances, the individuals may scroll through or spot check the video content to identify the portion they are interested in, which may be an inefficient way to access such portions of the video content. With an increased emphasis on virtual service enablement and enriching employee experiences, it may be important to improve the operational efficiency of such video access, while doing so in a way that does not unduly burden enterprise computing resources and network bandwidth.

SUMMARY

Aspects of the disclosure provide effective, efficient, scalable, and convenient technical solutions that address and overcome the technical problems associated with annotating video content and/or otherwise enriching and managing video content in enterprise computing networks. In accordance with one or more embodiments of the disclosure, a computing platform comprising at least one processor, a communication interface, and memory storing computer-readable instructions may train a video bookmarking and classification model using video content, wherein training the video bookmarking and classification model configures the video bookmarking and classification model to classify topics and identify speakers of future video content using speech to text (STT) and natural language processing (NLP). The computing platform may input new video content into the video bookmarking and classification model, which may cause the video bookmarking and classification model to output an annotated version of the new video content. For example, the video bookmarking and classification model may be configured to generate the annotated version of the new video content by: 1) using one or more STT techniques to produce STT results for the new video content, 2) performing topic classification based on the STT results for the new video content, 3) performing speaker identification based on analysis of voice information corresponding to the new video content, and 4) generating a visual index for the new video content, wherein the visual index includes a time based index, indicating one or more of: a speaker or a topic corresponding to time segments comprising the new video content. The computing platform may store the annotated version of the new video content, which may be navigable by a user using the visual index.

In one or more instances, prior to performing the topic classification, the computing platform may apply one or more NLP techniques to perform summarization of the STT results. In one or more instances, performing the summarization of the STT results may result in a shortened version of the STT results.

In one or more instances, the computing platform may perform the topic classification using the shortened version of the STT results. In one or more instances, performing the topic classification may result in one or more topics and one or more sub-topics corresponding to the STT results.

In one or more instances, performing the topic classification may result in multiple topics corresponding to at least one of the time segments. In one or more instances, the computing platform may use a convolutional neural network to translate text of visual index into sign language.

In one or more instances, translating the visual index may be performed: 1) prior to storing the visual index, and the stored visual index may include the translated text, or 2) upon receipt of a request to access a sign language version of the visual index, and the stored visual index may be stored without the translated text. In one or more instances, selection of a particular speaker or a specific topic within the visual index may cause a corresponding time segment of the new video content to play. In one or more instances, the topic may be one or more of: human resources, diversity, corporate, training, new product introduction, learning, leadership development, external speaker, get to know employee, onboarding, mentoring, service, or maintenance.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure describe speech to text (STT) and natural language processing (NLP) based video bookmarking and classification. For example, enterprise organizations may produce a variety of video content for various purposes such as training, leadership communication, instructions, and/or other purposes, which may amount to hours of recordings. In these instances, not all video content may be currently indexed and/or search enabled to enable an individual to reach specific video content (or even a specific topic or section within the video). Described herein in a solution for near-real time processing of a video through STT and various NLP techniques to create bookmarks, so that the video may be archived and indexed to be search enabled with a granularity of in-video topics without manual intervention. With an increased emphasis on virtual service enablement, and a push to enrich employee experience by offering technical help with videos, the systems and methods described herein may provide a practical and helpful solution that creates a fully automated self-service video catalogue without manual interference and with just plain video as a starting point.

In doing so, the following steps may be performed (these are described in further detail below). First, video speech may be converted into text. A module may convert and create paragraphs of text that capture the content in the video as text end to end. The text may then be pre-processed with natural language processing techniques (e.g., cleaned and profiled to create tags and topics). These tags may be a multi class identification and recognition token derived from the different parts of speech that may be unique to a speaker. This may be saved to create a speaker profile to be used in supervised learning later on. For example, pauses, interjections, and/or other speech characteristics may be captured and profiled.

The topics may be derived from modern topic classification techniques that may be used in indexing/cataloging the text. The text may be given a temporal component, and may be segmented along the time axis across the discovered topics. In these instances, the topics may be contextualized. The temporal component may be merged with topic classification to create a tree-index for the video, similar to a table of contents for a book. The contextualized text may be used to generate artificial gestures, and may be translated to sign language and added along the timeline of the video for playback along with the original content. The processed video may then be merged together with the index, the sign language, and temporally distributed text to allow the users to navigate to specifics as needed.

As an example scenario, a team may present some groundbreaking work on a particular product during a virtual event within an enterprise. The virtual event may be recorded, and the presentation may be mailed out to a large workforce for video playback. The methods described above may be deployed in real time or during post processing, where the video may be text translated, NLP applied and properly indexed, catalogued and topic highlighted on its timeline, along with opportunities to embed features such as sign language generation.

As a result, simple yet powerful video indexing and classification may be achieved by combining STT and NLP to create a contextualized, indexed content profile of a video.

In doing so, enterprise wide scaling may create contextual classes of video content, and employee experience may be improved.

Figure 1A:
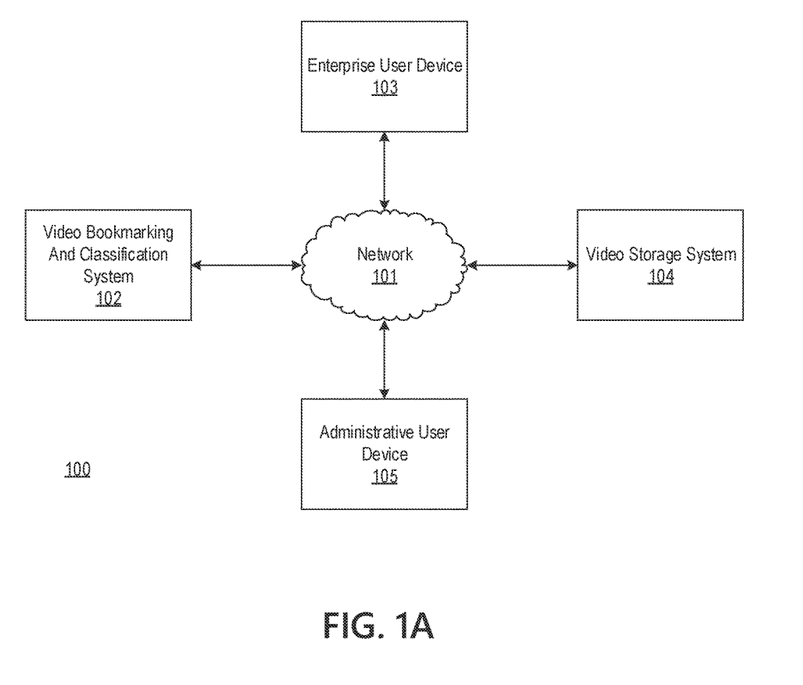
FIGS. 1A-1B depict an illustrative computing environment for video bookmarking and classification using STT and NLP in accordance with one or more example embodiments.
Figure 1B:
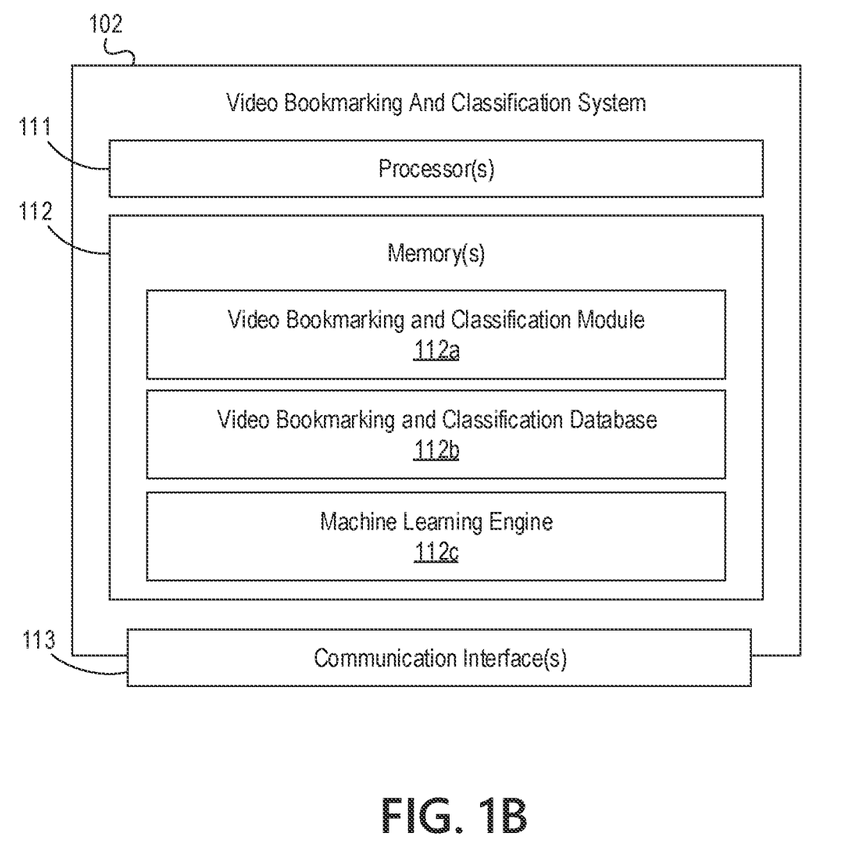

FIGS. 1A-1B depict an illustrative computing environment for video bookmarking and classification using STT and NLP in accordance with one or more example embodiments. Referring to FIG. 1A, computing environment 100 may include one or more computer systems. For example, computing environment 100 may include video bookmarking and classification system 102, enterprise user device 103, video storage system 104 and administrative user device 105.

As described further below, video bookmarking and classification system 102 may be a computer system that includes one or more computing devices (e.g., servers, server blades, or the like) and/or other computer components (e.g., processors, memories, communication interfaces) that may be implement one or more STT and/or NLP techniques that may be result in annotated video content.

Enterprise user device 103 may be a laptop computer, desktop computer, mobile device, tablet, smartphone, or the like that may be used by an employee of an enterprise organization (e.g., a financial institution, or the like). For example, the enterprise user device 103 may be used by one or more individuals to access annotated video content produced by the video bookmarking and classification system 102. In some instances, enterprise user device 103 may be configured to display one or more user interfaces (e.g., video display interfaces, and/or other interfaces).

Video storage system 104 may include one or more computing devices (e.g., servers, server blades, or the like) and/or other computer components (e.g., processors, memories, communication interfaces) that may be used to video content (e.g., human resources, diversity, corporate, training, new product introduction, learning, leadership development, external speakers, get to know executives, onboarding, mentorship, service, maintenance, and/or other videos) that may be annotated by the video bookmarking and classification system 102.

Administrative user device 105 may be a laptop computer, desktop computer, mobile device, tablet, smartphone, or the like that may be used by an employee or administrator of an enterprise organization (e.g., a financial institution, or the like). For example, the administrative user device 105 may be used by one or more individuals to initiate video annotation. In some instances, administrative user device 105 may be configured to display one or more user interfaces.

Computing environment 100 also may include one or more networks, which may interconnect video bookmarking and classification system 102. For example, computing environment 100 may include a network 101 (which may interconnect, e.g., video bookmarking and classification system 102, enterprise user device 103, video storage system 104, and/or administrative user device 105).

In one or more arrangements, video bookmarking and classification system 102, enterprise user device 103, video storage system 104, and/or administrative user device 105 may be any type of computing device capable of sending and/or receiving requests and processing the requests accordingly. For example, video bookmarking and classification system 102, enterprise user device 103, video storage system 104, and/or administrative user device 105 and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of video bookmarking and classification system 102, enterprise user device 103, video storage system 104, and/or administrative user device 105, may, in some instances, be special-purpose computing devices configured to perform specific functions.

Referring to FIG. 1B, video bookmarking and classification system 102 may include one or more processors 111, memory 112, and communication interface 113. A data bus may interconnect processor 111, memory 112, and communication interface 113. Communication interface 113 may be a network interface configured to support communication between video bookmarking and classification system 102 and one or more networks (e.g., network 101, or the like). Memory 112 may include one or more program modules having instructions that when executed by processor 111 cause video bookmarking and classification system 102 to perform one or more functions described herein and/or one or more databases that may store and/or otherwise maintain information which may be used by such program modules and/or processor 111. In some instances, the one or more program modules and/or databases may be stored by and/or maintained in different memory units of video bookmarking and classification system 102 and/or by different computing devices that may form and/or otherwise make up video bookmarking and classification system 102. For example, memory 112 may have, host, store, and/or include video bookmarking and classification module 112a, video bookmarking and classification database 112b, and machine learning engine 112c.

Video bookmarking and classification module 112a may have instructions that direct and/or cause video bookmarking and classification system 102 to execute advanced video indexing techniques. Video bookmarking and classification database 112b may store information used by video bookmarking and classification module 112a and/or video bookmarking and classification system 102 in application of advanced STT and NLP techniques for video annotation, and/or in performing other functions. Machine learning engine 112c may have instructions that direct and/or cause the video bookmarking and classification system 102 to set, define, and/or iteratively refine optimization rules and/or other parameters used by the video bookmarking and classification system 102 and/or other systems in computing environment 100.

Figure 2A:
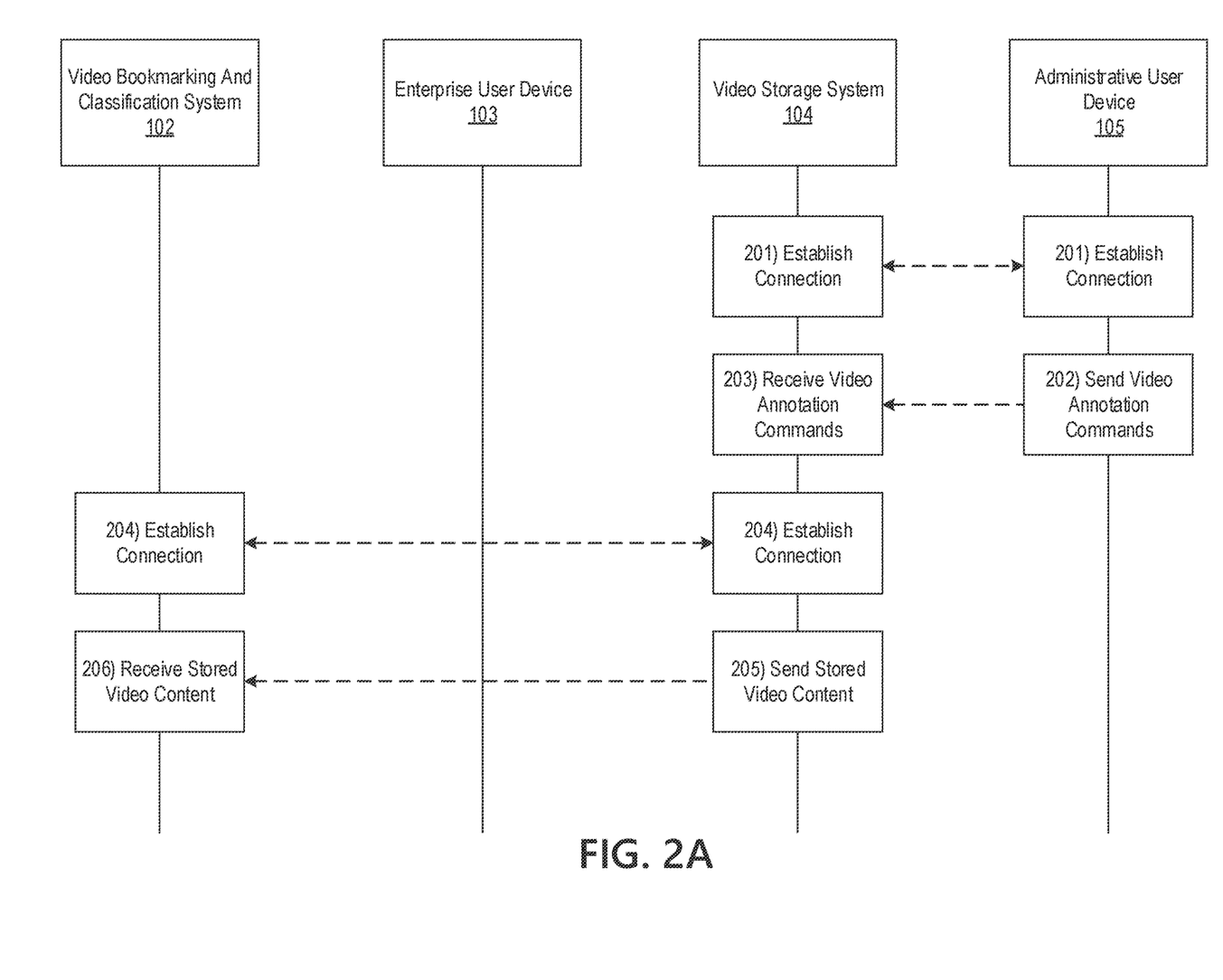
FIGS. 2A-2E depict an illustrative event sequence for video bookmarking and classification using STT and NLP in accordance with one or more example embodiments.

FIGS. 2A-2E depict an illustrative event sequence for video bookmarking and classification using STT and NLP in accordance with one or more example embodiments. Referring to FIG. 2A, at step 201, administrative user device 105 may establish a connection with video storage system 104. For example, administrative user device 105 may establish a first wireless data connection with the video storage system 104 to link the administrative user device 105 to the video storage system (e.g., in preparation for sending video annotation commands). In some instances, the administrative user device 105 may identify whether or not a connection is already established with the video storage system 104. If a connection is already established with the video storage system 104, the administrative user device 105 might not re-establish the connection. If a connection is not yet established with the video storage system 104, the administrative user device 105 may establish the first wireless data connection as described herein.

At step 202, the administrative user device 105 may send one or more video annotation commands to the video storage system 104. For example, the administrative user device 105 may send one or more commands indicating that video content (stored or streaming) should be annotated to include a visual index (as described further below). In some instances, the administrative user device 105 may send the video annotation commands to the video storage system 104 while the first wireless data connection is established.

At step 203, the video storage system 104 may receive the one or more video annotation commands sent at step 202. For example, the video storage system 104 may receive the one or more video annotation commands while the first wireless data connection is established.

At step 204, the video storage system 104 may establish a connection with the video bookmarking and classification system 102. For example, the video storage system 104 may establish a second wireless data connection with the video bookmarking and classification system 102 to link the video storage system 104 to the video bookmarking and classification system 102 (e.g., in preparation for sending video content (stored or streaming) to the video bookmarking and classification system 102). In some instances, the video storage system 104 may identify whether a connection is already established with the video bookmarking and classification system 102. If a connection is already established with the video bookmarking and classification system 102, the video storage system 104 might not re-establish the connection. If a connection is not yet established with the video bookmarking and classification system 102, the video storage system 104 may establish the second wireless data connection as described herein.

At step 205, based on or in response to the one or more video annotation commands, the video storage system 104 may send stored or streaming video content to the video bookmarking and classification system 102. For example, the video storage system 104 may send video content related to human resources, diversity, corporate, training, new product introduction, learning, leadership development, external speakers, get to know employees, onboarding, mentoring, service, maintenance, and/or other topics. In some instances, the video storage system 104 may send the stored or streaming video content while the second wireless data connection is established.

At step 206, the video bookmarking and classification system 102 may receive the stored or streaming video content. For example, the video bookmarking and classification system 102 may receive the stored or streaming video content via the communication interface 113 and while the second wireless data connection is established.

Figure 2B:
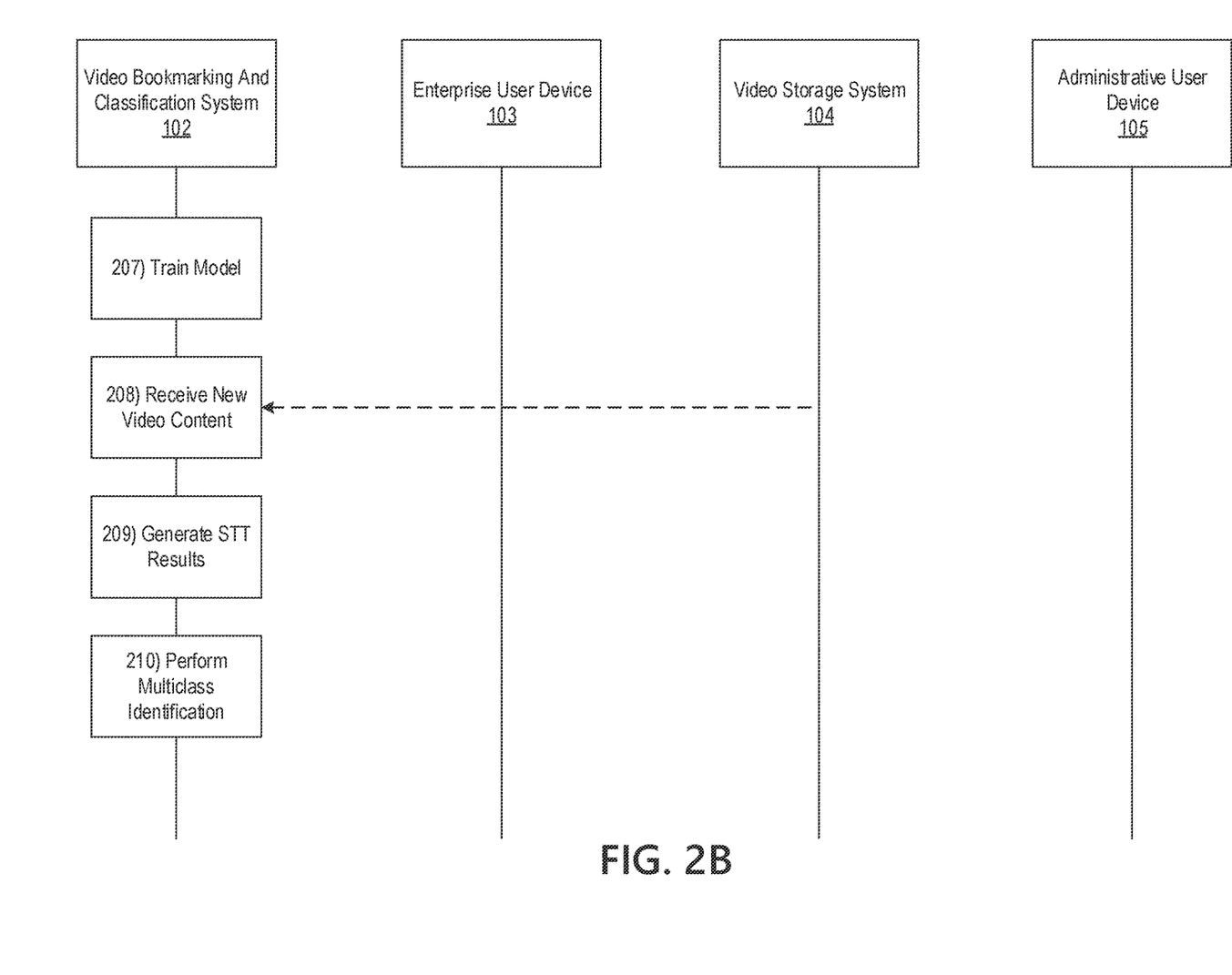

At step 207, the video bookmarking and classification system 102 may train video bookmarking and classification model, which may include a STT model and/or a NLP model, using the video content received at step 206. For example, the video bookmarking and classification system 102 may train the STT model to convert speech to text, and thus to produce textual results corresponding to audio content from the video content. Additionally or alternatively, the video bookmarking and classification system 102 may train a NLP model using the textual results and/or the video content. For example, the video bookmarking and classification system 102 may train the NLP to identify a speaker corresponding to speech segments. In doing so, the video bookmarking and classification system 102 may establish speaker profiles based on speech characteristics (e.g., tone, intonation, inflection, pauses, speed, pauses, interjections, way of speaking, pitch, word choice and/or other characteristics). In addition, the video bookmarking and classification system 102 may train the NLP model to perform topic classification. For example, the video bookmarking and classification system 102 may train the NLP model to classify portions of the textual results into one or more topics, sub-topics, and/or any hierarchical topic levels. More specifically, the video bookmarking and classification system 102 may train the NLP model to classify text as pertaining to human resources, diversity, corporate, training, new product introduction, learning, leadership development, external speaker, get to know employee, onboarding, mentoring, service, maintenance, and/or other topics related to internal corporate videos and/or other videos.

At step 208, the video bookmarking and classification system 102 may receive new video content. For example, the video bookmarking and classification system 102 may monitor the video storage system 104, and identify new content posted to or otherwise stored at the video storage system 104, and may receive the new video content via the communication interface 113 and while the second wireless data connection is established.

At step 209, the video bookmarking and classification system 102 may generate STT results for the new video content. For example, the video bookmarking and classification system 102 may feed the new video content (or at least the audio corresponding to the new video content) into the STT model, which may result in output of text corresponding to speech from the new video content. In some instances, in outputting the text, the STT model may tag the text with timestamps and/or other time segment identifiers that corresponding to a time during the new video content that each portion of the text corresponds to.

At step 210, the video bookmarking and classification system 102 may feed the STT results into the NLP model to perform multiclass identification/topic classification. For example, the NLP model may tag text segments within the STT results as corresponding to one or more topics, sub-topics, and/or other hierarchical topics (e.g., human resources, diversity, corporate, training, new product introduction, learning, leadership development, external speaker, get to know employee, onboarding, mentoring, service, maintenance, other topics related to internal corporate topics or other, and/or other topics.

Figure 2C:
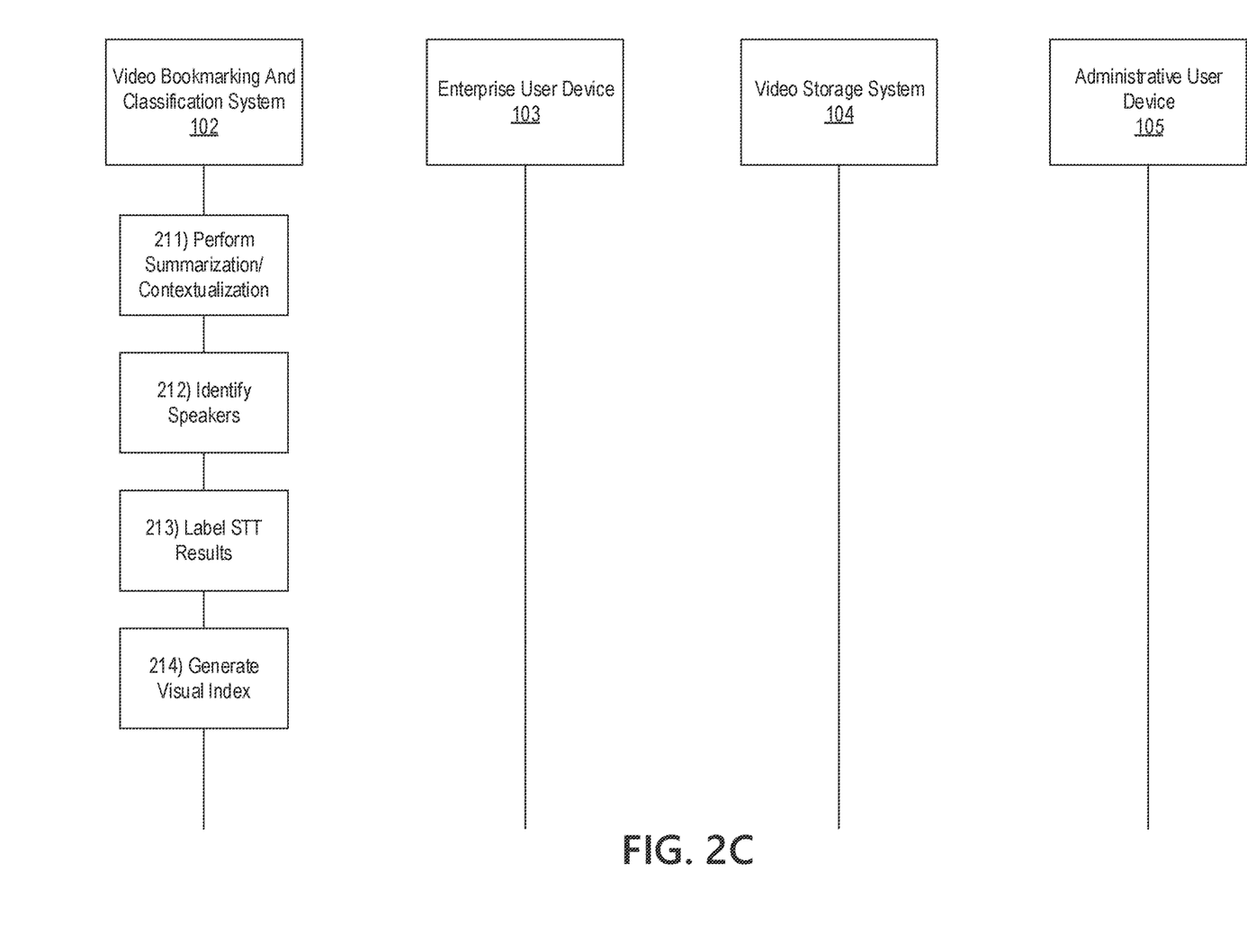

Referring to FIG. 2C, at step 211, the video bookmarking and classification system 102 may perform summarization/contextualization of the STT results. In some instances, step 211 may be performed prior to step 210 (e.g., as a pre-processing step). In these instances, the topic classification described at step 210 may be performed on the summarized/shortened version of the STT results. In other instances, step 212 may be performed after step 210. For example, the video bookmarking and classification system 102 may reduce the STT results to eliminate long gaps of silence and/or otherwise shorten/summarize the STT results (e.g., eliminate irrelevant text such as text indicating dialogue between a speaker and technical support attempting to fix a technical issue during a video presentation). In doing so, the video bookmarking and classification system 102 may make the STT results more convenient to read and/or reduce the file size to improve storage capabilities.

At step 212, the video bookmarking and classification system 102 may use the NLP model to identify one or more speakers corresponding to each portion of the STT results. For example, the NLP model may compare speaking characteristics within the new video content to each other to identify transitions between speakers (e.g., speaker #1 stops talking and speaker #2 responds). Subsequently, the NLP model may compare the speech characteristics of each identified speaker segment to the speaker profiles established by the NLP model during training. The NLP model may identify the closest speaker profile match for each speaker segment.

At step 213, the video bookmarking and classification system 102 may label the STT results with the identified speakers for each speaker segment. In some instances, in doing so, the video bookmarking and classification system 102 may produce labelled STT results that are tagged with corresponding topics and/or speakers, along with timestamps corresponding to the new video content.

At step 214, the video bookmarking and classification system 102 may generate a visual index for the new video content based on the labelled STT results. For example, the video bookmarking and classification system 102 may generate an index that includes the topic classifications, speaker identifiers, and/or other labels along with the corresponding timestamps. In doing so, the video bookmarking and classification system 102 may generate an index that resembles a table of contents for a book, and identifies at what time (e.g., in the new video content) a particular topic is discussed and/or at what time a particular speaker is speaking. In generating the visual index, the video bookmarking and classification system 102 may embed the visual index into the new video content, so as to configure the visual index for display along with the new video content. In doing so, the video bookmarking and classification system 102 may enable a viewer of the new video content to navigate the new video content using the index (e.g., select a particular topic/speaker and the new video content may automatically move to or initiate playback of a corresponding segment/portion of the new video content). This new video content that includes the visual index may be referred to as the new annotated video content.

In one or more instances, in generating the visual index, the video bookmarking and classification system 102 may use a convolutional neural network (which may e.g., be part of the video bookmarking and classification model) to translate text of the visual index into sign language. In these instances, the video bookmarking and classification system 102 may include the sign language in the visual index (e.g., up front or upon request by a viewer). In some instances, the video bookmarking and classification system 102 may update visual index to include the sign language prior to storing the new annotated video content (e.g., at step 215). In other instances, the video bookmarking and classification system 102 may store the visual index without translating it into sign language, and may perform the sign language translation upon receiving a request for the new annotated video content.

Figure 2D:
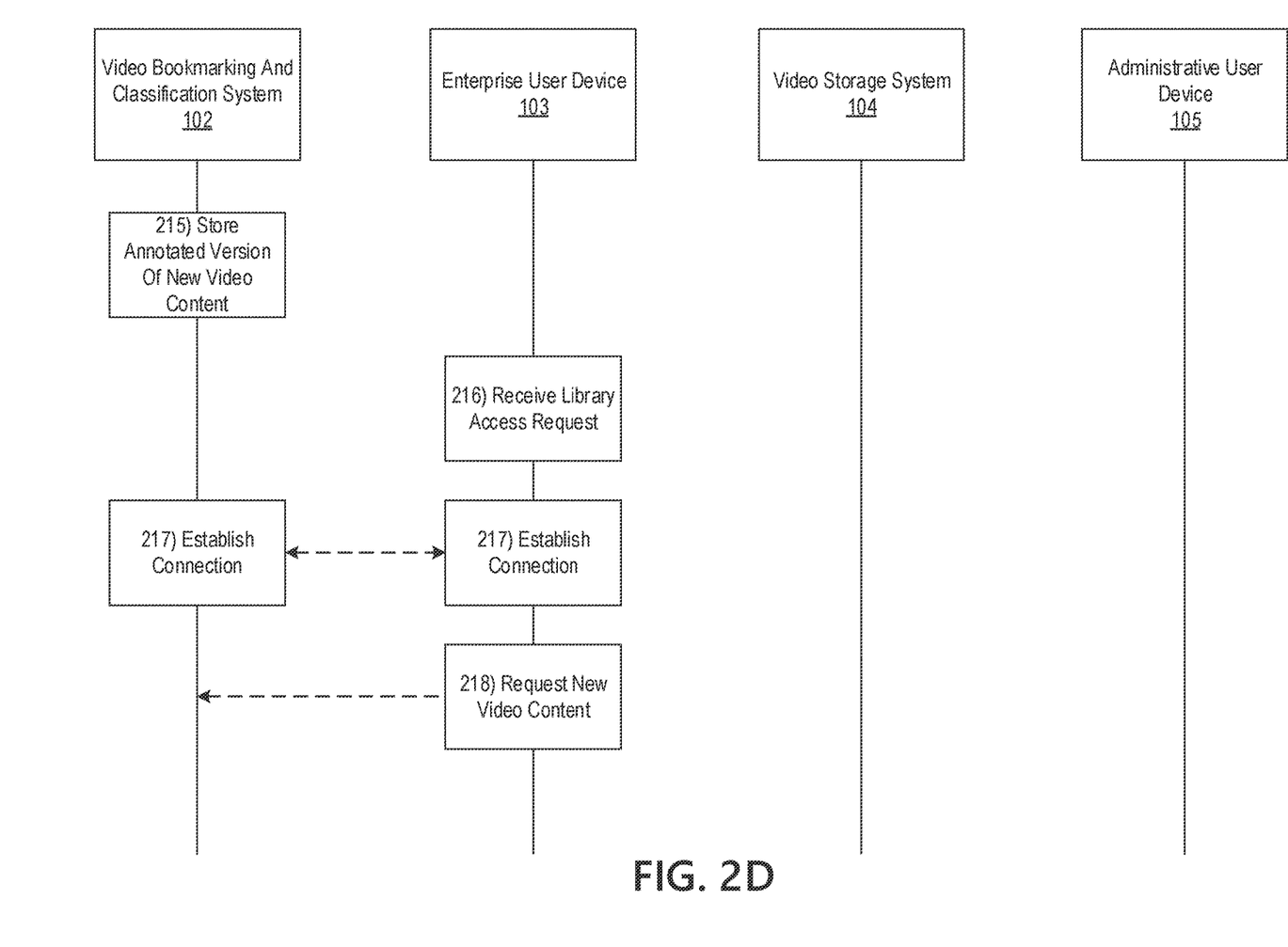

Referring to FIG. 2D, at step 215, the video bookmarking and classification system 102 may store the new annotated video content, which may enable access of the new annotated video content by future viewers. In some instances, the video bookmarking and classification system 102 may send the new annotated video content to the video storage system 104 for storage.

At step 216, the enterprise user device 103 may receive a video library access request. For example, the enterprise user device 103 may receive a user input requesting access to the new annotated video content from within a video library. In some instances, the video library may include an index of topics, and each topic may include a value of how many stored/streaming videos correspond to that topic (e.g., 15 human resources, or the like). In these instances, the viewer may select a particular topic, which may expose any available stored/streaming videos and/or stored annotated videos.

At step 217, the enterprise user device 103 may establish a connection with the video bookmarking and classification system 102. For example, the enterprise user device 103 may establish a third wireless data connection with the video bookmarking and classification system 102 to link the enterprise user device 103 to the video bookmarking and classification system 102 (e.g., in preparation for sending a request to access the new annotated video content). In some instances, the enterprise user device 103 may identify whether or not a connection is already established with the video bookmarking and classification system 102. If a connection is already established with the video bookmarking and classification system 102, the enterprise user device 103 might not re-establish the connection. If a connection is not established with the video bookmarking and classification system 102 may establish the third wireless data connection as described herein.

At step 218, the enterprise user device 103 may request the new annotated video content from the video bookmarking and classification system 102. For example, the enterprise user device 103 may send a request for the new annotated video content while the third wireless data connection is established.

Figure 2E:
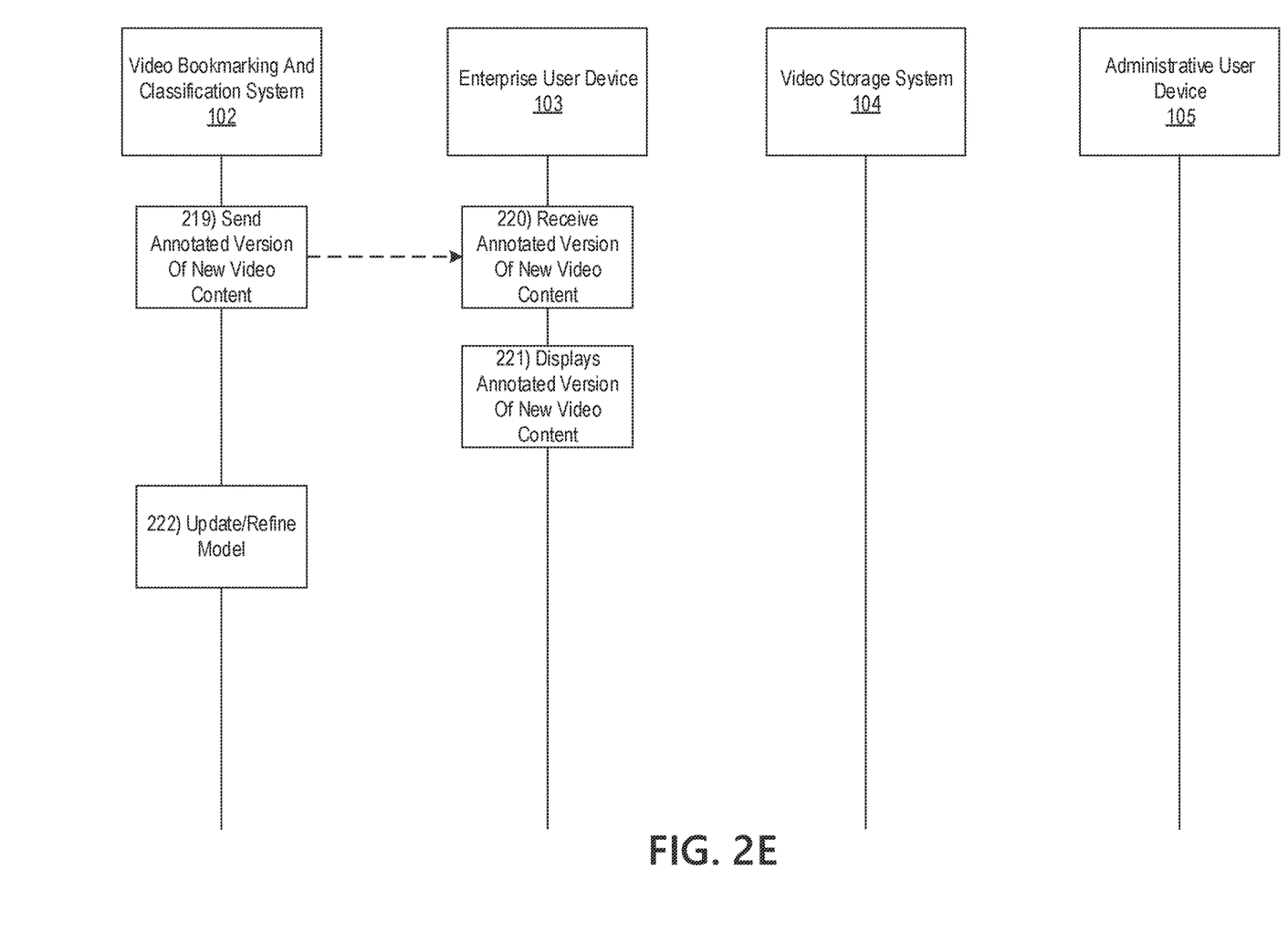

Referring to FIG. 2E, at step 219, the video bookmarking and classification system 102 may send the new annotated video content to the enterprise user device 103. For example, the video bookmarking and classification system 102 may send the new annotated video content to the enterprise user device 103 via the communication interface 113 and while the third wireless data connection is established. In some instances, the video bookmarking and classification system 102 may also send one or more commands directing the enterprise user device 103 to display the new annotated video content.

At step 220, the enterprise user device 103 may receive the new annotated video content and the one or more commands directing the enterprise user device 103 to display the new annotated video content. For example, the enterprise user device 103 may display the new annotated video content while the third wireless data connection is established.

Figure 4:
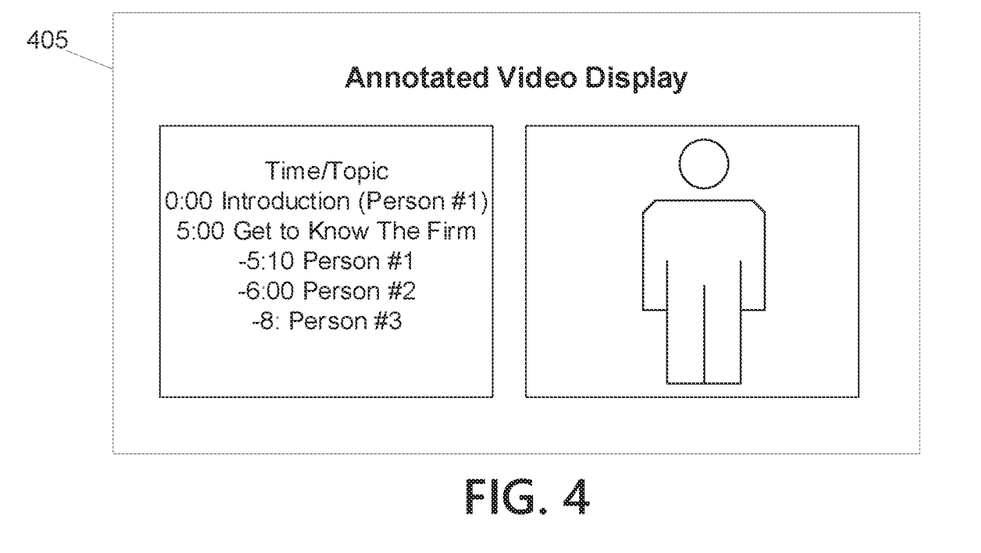
FIG. 4 depicts an illustrative graphical user interface for video bookmarking and classification using STT and NLP in accordance with one or more example embodiments.

At step 221, based on or in response to the one or more commands directing the enterprise user device 103 to display the new annotated video content, the enterprise user device 103 may display the new annotated video content. For example, the enterprise user device 103 may display a graphical user interface similar to graphical user interface 405, which is shown in FIG. 4, and which includes video content, along with a visual index that indicates a time segment corresponding to various topics and/or speakers within the video content. These topics and/or speakers may be selected by a user, which may cause the video content to navigate to a corresponding time segment of the video content.

In some instances, along with the new annotated video content, the enterprise user device 103 may display the STT results. For example, as the new annotated video content progresses, the STT results may stream the corresponding portion of the STT results (e.g., so that the text corresponding to the video is displayed along with a corresponding portion of the video). In doing so, the enterprise user device 103 may provide assistance for viewers that may have difficult hearing the audio portion of the new annotated video content, and enable such viewers to read the corresponding text as the new annotated video content plays.

At step 222, the video bookmarking and classification system 102 may update and/or refine the STT model and/or the NLP model based on the STT results, topic classification, speaker identification, and/or other analysis performed with regard to the new video content. In doing so, the video bookmarking and classification system 102 may cause the STT model and/or the NLP model to constantly adapt and improve based on new information, thus increasing accuracy of the models over time.

Figure 3:
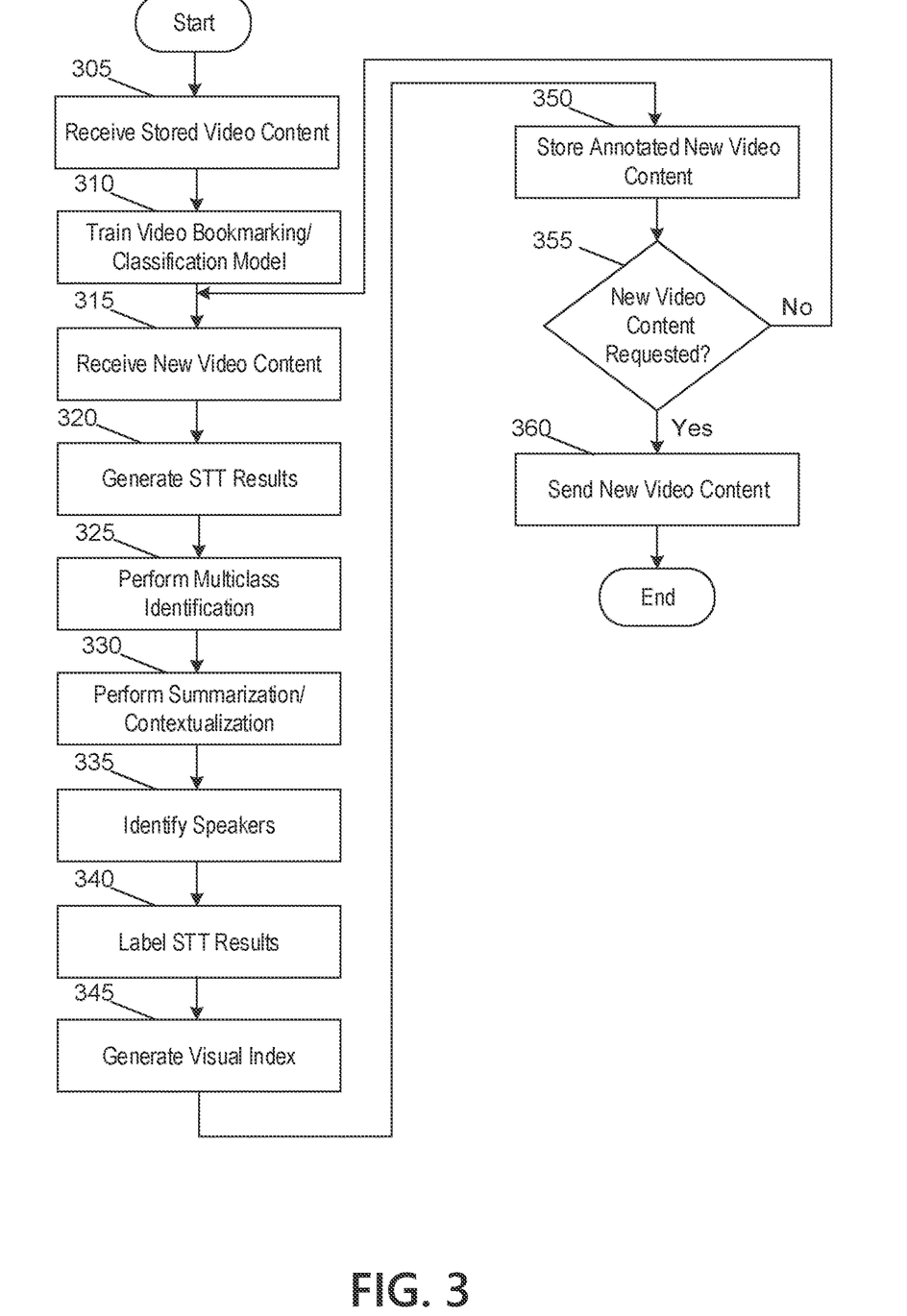
FIG. 3 depicts an illustrative method for video bookmarking and classification using STT and NLP in accordance with one or more example embodiments.

FIG. 3 depicts an illustrative method for video bookmarking and classification using STT and NLP in accordance with one or more example embodiments. Referring to FIG. 3, at step 305, a computing platform having at least one processor, a communication interface, and memory may receive stored/streaming video content. At step 310, the computing platform may train a video bookmarking and/or classification model (which may include a STT model and/or an NLP model) using the stored/streaming video content. At step 315, the computing platform may receive new video content. At step 320, the computing platform may input the new video content into the STT model to generate STT results. At step 325, the computing platform may perform multiclass identification and/or topic classification of the STT results. At step 330, the computing platform may perform summarization and/or contextualization of the STT results. At step 335, the computing platform may identify one or more speakers in the new video content using the NLP model. At step 340, the computing platform may label the STT results based on the identified one or more speakers. At step 345, the computing platform may generate a visual index for the new video content that includes topic and/or speaker labels for time segments of the new video content. At step 350, the computing platform may store annotated new video content that includes the visual index. At step 355, the computing platform may identify whether or not the annotated new video content was requested. If the annotated new video content was not requested, the computing platform may return to step 315. If the annotated new video content was requested, the computing platform may proceed to step 360. At step 360, the computing platform may send the annotated new video content to a computing device requesting the new video content.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
at least one processor;
a communication interface communicatively coupled to the at least one processor; and
memory storing computer-readable instructions that, when executed by the at least one processor, cause the computing platform to:
input new video content into a video bookmarking and classification model, wherein inputting the new video content into the video bookmarking and classification model causes the video bookmarking and classification model to output an annotated version of the new video content, wherein the video bookmarking and classification model is configured to generate the annotated version of the new video content by:
using one or more speech to text (STT) techniques to produce STT results for the new video content,
performing topic classification based on the STT results for the new video content,
performing speaker identification based on analysis of voice information corresponding to the new video content, and
generating a visual index for the new video content, wherein the visual index includes a time based index, indicating one or more of: a speaker or a topic corresponding to time segments comprising the new video content; and
store the annotated version of the new video content, wherein the annotated version of the new video content is navigable by a user using the visual index.

2. The computing platform of claim 1, wherein the memory stores additional computer-readable instructions that, when executed by the at least one processor, cause the computing platform to:
prior to performing the topic classification, applying one or more NLP techniques to perform summarization of the STT results.

3. The computing platform of claim 2, wherein performing the summarization of the STT results generates a shortened version of the STT results.

4. The computing platform of claim 3, wherein performing the topic classification comprises performing the topic classification using the shortened version of the STT results.

5. The computing platform of claim 1, wherein performing the topic classification results in one or more topics and one or more sub-topics corresponding to the STT results.

6. The computing platform of claim 1, wherein performing the topic classification results in multiple topics corresponding to at least one of the time segments.

7. The computing platform of claim 1, wherein the memory stores additional computer-readable instructions that, when executed by the at least one processor, cause the computing platform to:
use a convolutional neural network to translate text of visual index into sign language.

8. The computing platform of claim 7, wherein translating the visual index is performed:
prior to storing the visual index, wherein the stored visual index includes the translated text, or
upon receipt of a request to access a sign language version of the visual index, wherein the stored visual index is stored without the translated text.

9. The computing platform of claim 1, wherein selection of a particular speaker or a specific topic within the visual index causes a corresponding time segment of the new video content to play.

10. The computing platform of claim 1, wherein the topic comprises one or more of: human resources, diversity, corporate, training, new product introduction, learning, leadership development, external speaker, get to know employee, onboarding, mentoring, service, or maintenance.

11. The computing platform of claim 1, wherein the memory stores additional computer-readable instructions that, when executed by the at least one processor, cause the computing platform to:
train a video bookmarking and classification model using video content, wherein training the video bookmarking and classification model configures the video bookmarking and classification model to classify topics and identify speakers of future video content using STT and NLP.

12. A method comprising:
at a computing platform comprising at least one processor, a communication interface, and memory:
inputting new video content into a video bookmarking and classification model, wherein inputting the new video content into the video bookmarking and classification model causes the video bookmarking and classification model to output an annotated version of the new video content, wherein the video bookmarking and classification model is configured to generate the annotated version of the new video content by:
  using one or more speech to text (STT) techniques to produce STT results for the new video content,
  performing topic classification based on the STT results for the new video content,
  performing speaker identification based on analysis of voice information corresponding to the new video content, and
  generating a visual index for the new video content, wherein the visual index includes a time based index, indicating one or more of: a speaker or a topic corresponding to time segments comprising the new video content; and
store the annotated version of the new video content, wherein the annotated version of the new video content is navigable by a user using the visual index.

13. The method of claim 12, further comprising:
prior to performing the topic classification, applying one or more NLP techniques to perform summarization of the STT results.

14. The method of claim 13, wherein performing the summarization of the STT results generates a shortened version of the STT results.

15. The method of claim 14, wherein performing the topic classification comprises performing the topic classification using the shortened version of the STT results.

16. The method of claim 12, wherein performing the topic classification results in one or more topics and one or more sub-topics corresponding to the STT results.

17. The method of claim 12, wherein performing the topic classification results in multiple topics corresponding to at least one of the time segments.

18. The method of claim 12, further comprising using a convolutional neural network to translate text of visual index into sign language.

19. The method of claim 18, wherein translating the visual index is performed:
  prior to storing the visual index, wherein the stored visual index includes the translated text, or
  upon receipt of a request to access a sign language version of the visual index, wherein the stored visual index is stored without the translated text.

20. One or more non-transitory computer-readable media storing instructions that, when executed by a computing platform comprising at least one processor, a communication interface, and memory, cause the computing platform to:
  input new video content into a video bookmarking and classification model, wherein inputting the new video content into the video bookmarking and classification model causes the video bookmarking and classification model to output an annotated version of the new video content, wherein the video bookmarking and classification model is configured to generate the annotated version of the new video content by:
    using one or more speech to text (STT) techniques to produce STT results for the new video content,
    performing topic classification based on the STT results for the new video content, performing speaker identification based on analysis of voice information corresponding to the new video content, and
    generating a visual index for the new video content, wherein the visual index includes a time based index, indicating one or more of: a speaker or a topic corresponding to time segments comprising the new video content; and
  store the annotated version of the new video content, wherein the annotated version of the new video content is navigable by a user using the visual index.

* * * * *

UNITED STATES PATENT AND TRADEMARK OFFICE
CERTIFICATE OF CORRECTION

PATENT NO. : 11,874,867 B2
APPLICATION NO. : 17/894247
DATED : January 16, 2024
INVENTOR(S) : Raj et al.

Page 1 of 1

It is certified that error appears in the above-identified patent and that said Letters Patent is hereby corrected as shown below:

In the Claims

Column 14, Line 27:
In Claim 20, after "content,", insert --¶--

Signed and Sealed this
Seventh Day of October, 2025

John A. Squires
*Director of the United States Patent and Trademark Office*